United States Patent [19]
Hume et al.

[11] Patent Number: 5,344,574
[45] Date of Patent: Sep. 6, 1994

[54] SEPARATION OF OIL FROM TRANSFORMER FILTER CAKE

[76] Inventors: Frank C. Hume, #10 - 1460 Ingenika, Prince George, British Columbia, Canada, V2M 3Z9; Alan A. Downie, 116 - 308 Forbes Avenue, N. Vancouver, British Columbia, Canada, V7M 2E6

[21] Appl. No.: 69,280

[22] Filed: May 28, 1993

[51] Int. Cl.$^5$ ............................................. B01D 41/02
[52] U.S. Cl. .................................. 210/772; 210/796; 210/797
[58] Field of Search ............... 210/768, 772, 791, 792, 210/796, 797, 730, 774

[56] References Cited
U.S. PATENT DOCUMENTS

| | | | |
|---|---|---|---|
| 4,406,796 | 9/1983 | Duval | 210/772 |
| 4,501,670 | 2/1985 | Tyson et al. | 210/772 |
| 4,544,491 | 10/1985 | Tyson et al. | 210/797 |
| 4,614,597 | 9/1986 | Stuart et al. | 210/774 |
| 4,711,728 | 12/1987 | Remacle et al. | 210/772 |
| 4,772,399 | 9/1988 | Stuart et al. | 210/772 |
| 5,056,541 | 10/1991 | Schade et al. | 210/772 |
| 5,209,851 | 5/1993 | Hume et al. | 210/610 |

FOREIGN PATENT DOCUMENTS

| | | |
|---|---|---|
| 1182227 | 2/1985 | Canada . |
| 2531732 | 2/1977 | Fed. Rep. of Germany ...... 210/772 |

*Primary Examiner*—Neil McCarthy
*Attorney, Agent, or Firm*—Graham & James

[57] ABSTRACT

The separation of oil from filter cake, such as a transformer filter cake, is achieved by contact mixing filter cake with protein additives in water for a sufficient time for substantially all the oil to be displaced from the filter cake, flushing displaced oil and filter medium with water in a separating device and collecting the oil and the filter medium separately. The separation occurs with little or no remediation of the oil taking place so that both the oil and the filter medium can be reused.

25 Claims, 2 Drawing Sheets

SEPARATION OF OIL FROM TRANSFORMER FILTER CAKE

TECHNICAL FIELD

The present invention relates to the separation of oil from filter cake to provide recycling of both the oil and the filter medium. More specifically the present invention relates to treating filter cake with protein in water for a sufficient time for the oil to be displaced and separated from the filter medium.

BACKGROUND ART

Oil in power transformers is regularly filtered every twelve to eighteen months to remove impurities which build up during operation. The impurities can include carbon as well as other substances that cause an insulating property breakdown of the oil. The filter medium generally used is classified as a montmorillonite clay. This type of clay has an expanding structure with high adsorptive powers. The material is crystalline and non-plastic similar to fuller's earth which is a natural fine grained material. Throughout the text the oil soaked filter medium is referred to as "filter cake".

After the transformer oil has been filtered, the oil remaining in the filter cake can be higher than 30% of the total weight. In the past this filter cake has been disposed of in landfills with consequent leaching out of the oil to the subsoil, water table and surface streams. Today many landfills are not accepting this highly toxic material so that utility companies store the spent filter cake awaiting a treatment solution. It is known for example that in Ontario, Canada, some 2,000 tons of filter cake are generated annually. It is believed that the amount of stored filter cake in both the United States and Canada is considerable.

Remediation methods for toxic materials are disclosed in U.S. Pat. No. 5,209,851 issued May 11, 1993 to Hume and Downie. The process disclosed herein relates to treating toxic waste materials with protein nutrients to remediate the contaminated material and efficiently reduce the toxic conditions to innocuous levels. A method of treating waste water utilizing an aerating process is disclosed in Canadian Patent 1,182,227 issued Feb. 5, 1985 to Hume. In this process effluent is treated such that substantially no sludge is formed. Toxic effluent is first skimmed to remove floating oil and other solids. The effluent is then vigorously mixed and aerated so the oily material present in the effluent is maintained in suspension such that minimum flocculation occurs. The mixing and aeration continues for a sufficient period of time to permit remediation of the carbon impregnated oily waste water.

DISCLOSURE OF INVENTION

It is an aim of the present invention to separate substantially all oil from filter cake. It has been found that the process disclosed in U.S. Pat. No. 5,209,851 may be used to bioremediate the filter cake and break down the oil. However, such a process is not efficient as considerable time is necessary for the remediation process because of the high levels of oil in the filter cake. Furthermore, by breaking down the oil, it cannot be recycled or reused. It is an aim of the present application not to remediate the oil, but to separate the oil from the filter cake and it has been found that separation may be achieved by mixing the filter cake with protein in water for a time sufficient to displace most of the oil from the filter cake. The protein in water displaces the oil in the filter cake and the filter medium seems to have more affinity for the protein than for the oil.

It is an aim of the present invention to clean the filter cake and remove the oil so that the filter medium can be dried and then reused or recycled. In another embodiment the cleaned filter medium may be used as an adsorbent for soaking up oil and other liquids from oily floors. It is a further aim of the present invention to provide a process to clean this adsorbent material that has been used on floors and again separate the oil from the adsorbent material for reuse.

The oil separated from the filter cake may be reused as transformer oil or can be used as a burner fuel provided PCB levels are acceptable.

The present invention provides a process for separating oil from filter cake, comprising the steps of contact mixing filter cake with protein additives in water for a sufficient time for substantially all the oil to be displaced from the filter cake, flushing displaced oil and filter medium with water in a separating means, collecting oil from the separating means, and collecting filter medium separately from the oil.

The present invention also provides a process for separating oil from filter cake, comprising the steps of contact mixing filter cake with protein additives in water for a sufficient time for substantially all the oil to be displaced from the filter cake, flushing displaced oil and filter medium with water in a dehydrator separating means with a weir overflow, collecting oil flowing over the weir overflow with the protein additives and water, and collecting filter medium fed from the dehydrator separating means in a filter medium bin.

It has been found that there is a difference in relatively recently used filter cake and filter cake that has been stored for some time, referred to throughout the text as "aged filter cake". In the latter case the oily contaminates bond more tenaciously to the filter medium and thus become more difficult to separate. It has been found that substantially all the oil may be separated from the filter cake for recently used filter cake. In the case of aged filter cake, only about 70% of the oil may be separated and the remainder of the oil is rinsed out to clean the filter medium.

The present invention provides an additional process for separating residual oil from aged filter cake after it has first been treated with protein additives and water, the additional process comprising the steps of contact mixing residual aged filter cake with protein additives in water and a wetting agent in a contact mixing means, for a sufficient time for at least a greater portion of the oil to separate from the aged filter cake; collecting separated filter medium from the contact mixing means; feeding separated oil, emulsified oil, protein additives, water and filter medium fines from the contact mixing means into an oil collecting container means; separating the emulsified oil in the oil collecting container means, and collecting the oil from the oil collecting container means.

BRIEF DESCRIPTION OF THE DRAWINGS

In drawings which illustrate embodiments of the present invention.

BEST MODE FOR CARRYING OUT THE INVENTION

The basic protein additives suitable for displacement of oil are hydrolysed protein materials and may include surfactants depending upon the ease or otherwise of wetting the filter cake. Wetting agents are used for displacing residual oil from aged filter cake. Good contact between the filter cake and the protein nutrients and water solution is necessary for the effectiveness of the process. The selection of the protein additives, the concentration in water and the option, selection and concentration of the surfactant is determined by bench tests on the filter cake prior to the process commencing. In one embodiment it has been found that not more than 5% by weight of protein additives in water is required. In other cases concentrations as low as 1% are suitable. Again, the specific ratio is determined by bench tests on the filter cake prior to commencing the process.

The protein additives are selected from a number of sources including powdered cows milk, soya bean oil, soya bean meal, fish oil, fish meal, rendering plant by-products including bones, feathers and quills, slaughter house byproducts, brewery residues and brewery bottoms. The selection of hydrolysed protein additives are made after bench tests on the filter cake prior to commencement of the process.

Figure 1:
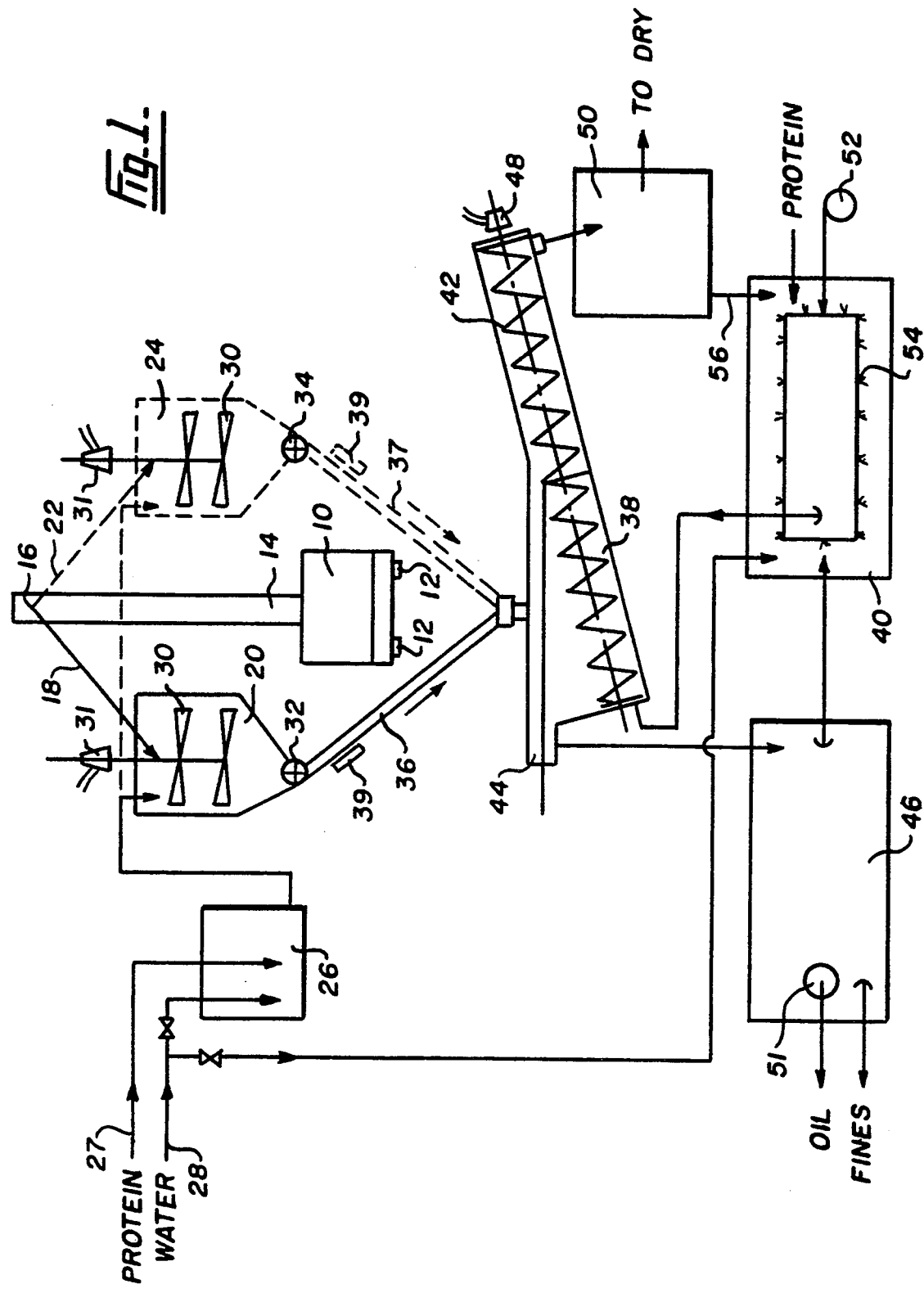
FIG. 1 is a diagram showing a process according to one embodiment of the present invention for separating oil from filter cake.

Referring now to FIG. 1, the filter cake is fed to a receiving hopper 10, preferably located at floor or ground level for ease of filling. The receiving hopper 10 has load cells 12 in order to know the weight of material being processed. In one example about 2,000 lbs. are loaded into the receiving hopper 10. A screen (not shown) is provided over the hopper to prevent extraneous rubbish such as rags and the like from falling into the hopper. An elevating conveyor 14, preferably a bucket elevator, raises the filter cake to a discharge 16 where it is fed either to a first chute 18 leading to a first mixer 20 or via a second chute 22 to a second mixer 24. The filter cake is fed in different batches to one of the two mixers 20,24.

A protein and water preparation tank 26 is shown having a metered protein feed 27 and a metered water feed 28. Thus the desired ratio of protein additives and water are combined in the preparation tank 26 and then the required quantity of protein additives in water is fed to either the first mixer 20 or the second mixer 24, whichever has the filter cake therein. Each of the mixers 24 has mixing blades 30 powered by a motor 31 which in one embodiment is a hydraulic motor. Mixing occurs at about 2 rpm in one or other of the mixers 20 and 24 for a predetermined time. This time is sufficient for the protein additives in water to displace substantially all the oil from the filter cake. In one embodiment, utilizing 2,000 lbs. of filter cake, the time for mixing was between fifteen and twenty minutes. The time is preferably under thirty minutes, although this time depends upon the type of oil and other contaminants in the filter cake. The time is determined by bench tests on the filter cake.

After the mixing step, a discharge valve 32 positioned below the first mixer 20 or a discharge valve 34 positioned below the second mixer 24, is opened and the displaced oil and filter medium together with the protein additives in water discharge by gravity through conduits 36 and 37, to an oil separation and filter medium screw feed dehydrator 38. Vibrators 39 are provided on each conduit 36,37 to ensure free flow of the displaced oil, protein additives and water, together with the filter medium.

In a preferred embodiment the protein additives in water from the preparation tank 26 are heated to 20° C. The temperature of the protein additives in water affects the time of separation of oil from the filter cake, particularly in cold operating conditions.

The mixing process occurring in the mixers 20 and 24 is for a sufficient time so that substantially all the oil is displaced from the filter cake. However in aged filter cake some oil may remain on or in the filter cake.

In one embodiment the oil and filter cake mixed with protein additives in water remains in the screw feed dehydrator 38 for about twenty minutes. Water is pumped into the screw feed dehydrator 38 from a water runoff basin 40 to assist in separating the oil displaced from the filter cake. The screw 42 in the screw feed dehydrator 38 rotates to and fro continuously. The screw feed dehydrator 38 is powered by an electric motor or hydraulic motor, and can be reversed so that it partially dehydrates or squeezes the liquid out of the filter cake and then remixing again in the liquid. Oil separated from the filter cake rises to the top of the screw feed dehydrator 38 to an adjustable weir 44, the oil spills over the weir 44 and passes down into an oil basin 46. Some clay fines are included with the oil. Water also spills over the weir 44 flowing into the oil basin 46. The height of the weir 44 can be adjusted thus the quantity of liquid in the screw feed dehydrator 38 can be controlled. The screw conveyor 42 rotated by motor 48 moves the filter medium separated from the oil upwards and then deposits it into a filter medium bin 50.

The combination of oil, water and filter medium fines spill over the weir 44 and pass into the oil basin 46 which is large enough to have a holding capacity of at least three days for the oil and seven to ten days for the fines. From the oil basin 46 the oil is skimmed off the top of the basin by a skimmer 51 to holding tanks for refining and reuse. The fines on the bottom of the oil basin 46 are suction pumped periodically to storage drying. These fines may be remixed with clean filter medium from bin 50. The fines represent less than 10% of the original weight of the filter cake.

Water in the oil basin 46 is positioned above the fines and below the oil and is pumped from the oil basin 46 back into the water runoff basin 40. Make up water is added to the water runoff basin 40 from the water supply 28 to maintain sufficient water in the runoff basin 40 to ensure water flushing of the screw feed dehydrator 38 is always maintained. In one embodiment a metered quantity of protein is added to the water runoff basin 40 to seed the basin. A blower 52 provides aeration through aerators 54 in the water runoff basin 40. The water and oil residue remain in the water runoff basin 40 long enough for biodegradation to occur to any oil remaining in the water runoff basin 40. The oil basin 46 and water runoff basin 40 may be constructed as tanks above grade level.

The filter cake bin 50 has a drain 56 for runoff to flow into the water runoff basin 40.

The clean filter medium from the filter medium bin 50 is emptied and laid out for drying. If some oil is still present in the cake, then biodegradation occurs in air in a matter of days. After drying the filter medium and can be reused either as a transformer filter medium or, alternatively, for depositing on the floor to soak up oil and other liquid contaminants. Such a material is sometimes referred to as "floor dry".

Figure 2:
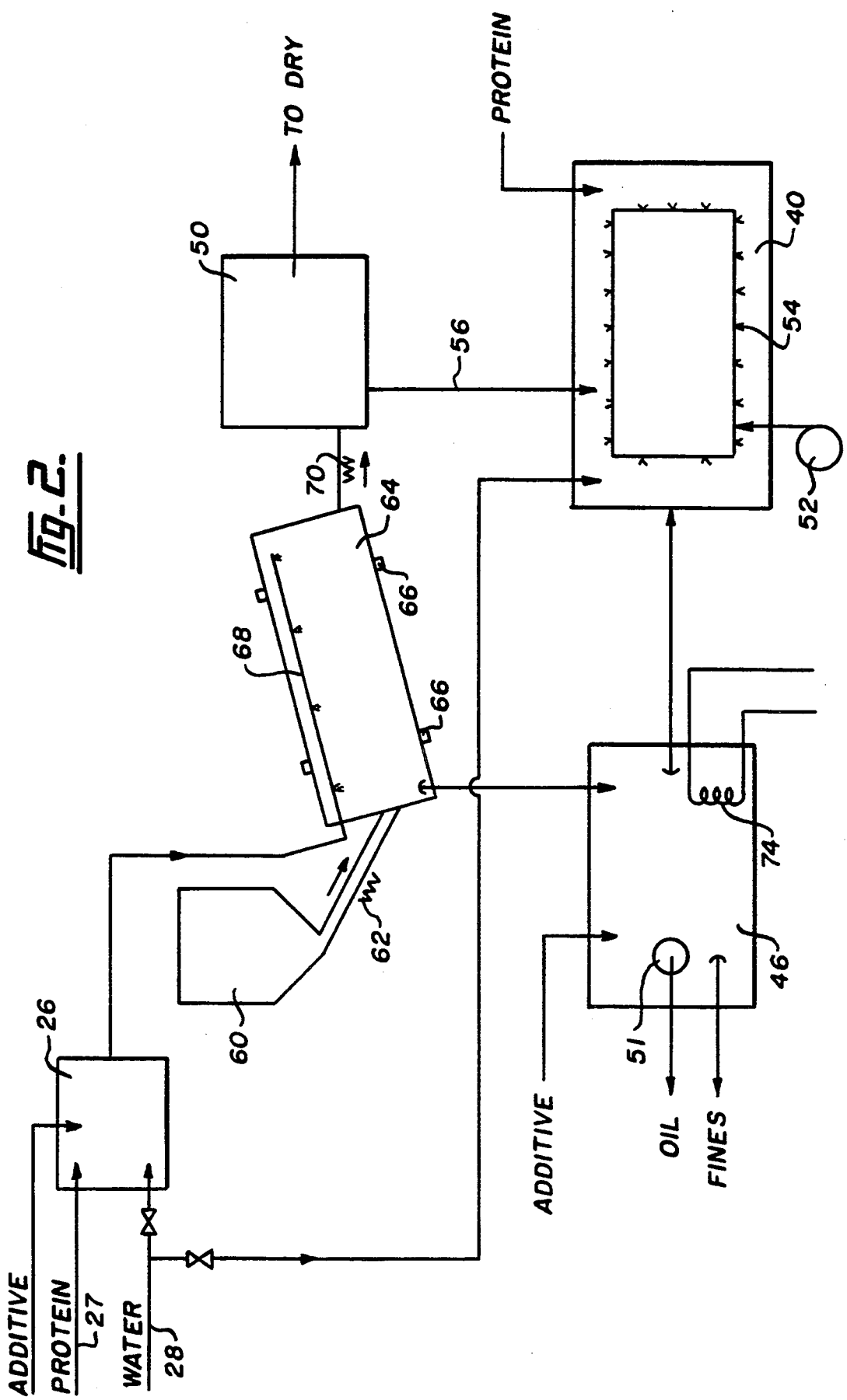
FIG. 2 is a diagram showing a process according to another embodiment of the present invention for separating oil from aged filter cake.

When aged filter cake is to be treated, a surfactant is added to the protein additives and water preparation tank 26, and the aged filter cake is treated in the same way as described and shown in FIG. 1. As much oil as possible is displaced from the aged filter cake with the oil in a natural state. The residual aged filter cake is then fed from the filter medium bin 50 as shown in FIG. 1 to a feed hopper 60 as shown in FIG. 2. The residual aged filter cake is fed from the hopper 60, which is equipped with vibrators 62 into a rotating rinse drum 64 which rotates on bearing rings 66 driven by hydraulic or electric motors.

A wetting agent surfactant additive is metered into the protein additives and water preparation tank 26 and the desired ratio of additive, protein additives and water mixed therein. The mixture is fed to spray bars 68 in the revolving drum 64. Violent contact mixing occurs to the residual aged filter cake. The residual oil is emulsified and separated from the aged filter cake. The cleaned filter medium is dehydrated out of the drum 64 and passes on a vibratory conveyor 70 to the filter cake bin 50. The emulsified oil, fines, additive, protein and water mixture discharges from the lower end of the drum 64 and is fed into the oil basin 46, which may be either a basin in the ground or an above ground tank.

A heater 74 provides heat to the liquid in the oil basin 46 and in certain cases another additive such as a demulsifier is added to the oil basin to separate the oil, water and fines emulsion. As shown in FIG. 1, and previously explained, the oil is skimmed off by skimmer 51 to holding tanks, the fines on the bottom of the oil basin 46 are suction pumped periodically to storage drying and the water is pumped from the oil basin 46 into the water runoff basin 40.

It is found that the process of treating aged filter cake removes the oil bonded to the aged filter cake. Any remaining oil may be left to remediate in the water runoff basin 40 or during a drying period according to the process disclosed in U.S. Pat. No. 5,209,851. Nearly all the oil can be separated, but in each case initial bench tests are carried out to determine the combination of protein and additive, and the contact mixing time necessary for separation.

Initial tests indicate a 97% recovery of oil and filter medium is achieved. The oil recovered was burned in a heater and the recovered filter medium has been used successfully as "floor dry".

Various changes may be made to the process described herein without departing from the scope of the present invention which is limited only by the following claims.

The embodiments of the present invention in which an exclusive property or privilege is claimed are defined as follows:

1. A process for separating oil from filter cake, comprising the steps of:
   contact mixing filter cake with protein additives in water, said protein additives being selected from the group consisting of powdered cows milk, soy bean oil, soya bean meal, fish oil, fish meal, rendering plant byproducts, slaughter house byproducts, brewery residues and brewery bottoms, said mixing for a sufficient time for substantially all the oil to be displaced from the filter cake;
   flushing displaced oil and filter medium with water in a separating means;
   collecting oil from the separating means, and
   collecting filter medium separately from the oil.

2. A process for separating oil from filter cake, comprising the steps of:
   contact mixing filter cake with protein additives in water, said protein additives being selected from the group consisting of powdered cows milk, soya bean oil, fish oil, fish meal, rendering plant byproducts, slaughter house byproducts, brewery residues and brewery bottoms, said mixing for a sufficient time for substantially all the oil to be displaced from the filter cake;
   flushing displaced oil and filter medium with water in a dehydrator separating means with a weir overflow;
   collecting oil flowing over the weir overflow in an oil collecting container means with the protein additives and water, and
   collecting filter medium fed from the dehydrator separating means in a filter medium bin.

3. The process for separating oil from filter cake according to claim 1 including a surfactant with the protein additives.

4. The process for separating oil from filter cake according to claim 2 wherein the protein additives are not more than 5% by weight of the combination of the protein additives and water.

5. The process for separating oil from oil filter cake according to claim 2 wherein the filter cake is a type of montmorillonite clay.

6. The process for separating oil from filter cake according to claim 2 wherein the protein additives in water are heated to at least 20° C.

7. The process for separating oil from filter cake according to claim 2 wherein the contact mixing occurs for less than twenty minutes, in which time the oil is substantially displaced from the filter cake.

8. The process for separating oil from filter cake according to claim 2 wherein the contact mixing occurs in a vessel having mixing blades rotating therein.

9. The process for separating oil from filter cake according to claim 2 wherein the displaced oil and filter medium are gravity fed after contact mixing to a screw feed separating means, and wherein the screw feed separating means comprises a filter medium dehydration screw conveyor in a screw conveyor container.

10. The process for separating oil from filter cake according to claim 9 wherein the contact mixing occurs in two separate mixing vessels, each vessel having mixing blades rotating therein, and each vessel having a sequential discharge means to feed the displaced oil and filter medium to the screw feed separating means sequentially, with the filter medium dehydration screw conveyor operating continuously.

11. The process for separating oil from filter cake according to claim 9 wherein the filter medium dehydration screw conveyor is at an angle feeding upwards to feed the filter medium separately from the oil and water in the screw conveyor container and wherein the weir overflow is adjustable for height to provide a liquid height in the screw conveyor container.

12. The process for separating oil from filter cake according to claim 10 including a hopper for receiving filter cake and including a conveyor to feed the two separate mixing vessels sequentially.

13. The process for separating oil from filter cake according to claim 2 wherein the oil collection container means collects oil, water and fines from the filter cake flowing over the weir overflow, the oil collection container means being of sufficient size to retain the oil therein for at least three days.

14. The process for separating oil from filter cake according to claim 13 wherein oil is skimmed from the oil collection container means, fines are collected from the bottom of the oil collection container means, and water between the fines and the oil is recirculated to the screw feed separating means.

15. The process for separating oil from filter cake according to claim 2 including a water basin means for providing water for flushing displaced oil and filter medium in the dehydrator separating means and wherein water spilling over the weir overflow with the oil passes to the oil collection container means and is returned to the water basin means.

16. The process for separating oil from filter cake according to claim 15 including continuous aeration means in the water basin means to biodegrade any oil present in the water basin means.

17. The process for separating oil from filter cake according to claim 1, wherein the filter cake is aged filter cake and including the additional steps of:

contact mixing residual oil filter cake with said protein additives in water and a wetting agent in a contact mixing means, for a sufficient time for at least a portion of the oil to separate from the residual aged filter cake;

collecting separated filter medium from the contact mixing means;

feeding separated oil, emulsified oil, protein additives, water and filter medium fines from the contact mixing means into an oil collecting container means;

breaking down the emulsified oil in the oil collecting container means, and collecting the oil from the oil collecting container means.

18. The process for separating oil from aged filter cake according to claim 17 wherein the contact mixing means comprises a revolving rinse drum, and wherein the protein additives in water and the wetting agent are premixed and sprayed onto the filter cake in the drum.

19. The process for separating oil from aged filter cake according to claim 18 wherein the separated filter medium is dehydrated out of the drum and collected in a filter medium bin.

20. The process for separating oil from aged filter cake according to claim 17 wherein heating means are provided for the oil collecting container means.

21. The process for separating oil from aged filter cake according to claim 17 including adding an emulsion breaker additive in the oil collecting container means.

22. The process for separating oil from filter cake according to claim 17 wherein the oil collecting container means is of sufficient size to retain the oil therein for at least three days.

23. The process for separating oil from filter cake according to claim 22 wherein oil is skimmed from the oil collecting container means and fines are collected from the bottom of the oil collecting container means.

24. The process for separating oil from aged filter cake according to claim 17 including a water basin means for receiving water from the oil collecting container means.

25. The process for separating oil from aged filter cake according to claim 24 including aeration means in the water basin means to biodegrade any oil present in the water basin means.

* * * * *